(12) United States Patent
Tsujioka

(10) Patent No.: US 10,862,324 B2
(45) Date of Patent: Dec. 8, 2020

(54) POWER SUPPLY SYSTEM

(71) Applicant: DENSO CORPORATION, Kariya (JP)

(72) Inventor: Teruhiro Tsujioka, Kariya (JP)

(73) Assignee: DENSO CORPORATION, Kariya (JP)

( * ) Notice: Subject to any disclaimer, the term of this patent is extended or adjusted under 35 U.S.C. 154(b) by 75 days.

(21) Appl. No.: 16/088,923

(22) PCT Filed: Feb. 24, 2017

(86) PCT No.: PCT/JP2017/007135
§ 371 (c)(1),
(2) Date: Sep. 27, 2018

(87) PCT Pub. No.: WO2017/169395
PCT Pub. Date: Oct. 5, 2017

(65) Prior Publication Data
US 2019/0109479 A1    Apr. 11, 2019

(30) Foreign Application Priority Data
Mar. 31, 2016  (JP) .................................. 2016-071660

(51) Int. Cl.
*H02J 7/00* (2006.01)
*B60R 16/033* (2006.01)
*B60R 16/03* (2006.01)
*H02J 1/00* (2006.01)

(52) U.S. Cl.
CPC ............ *H02J 7/0068* (2013.01); *B60R 16/03* (2013.01); *B60R 16/033* (2013.01); *H02J 1/00* (2013.01); *H02J 7/00* (2013.01); *H02J 7/0029* (2013.01)

(58) Field of Classification Search
CPC .... H02J 7/0068; H02J 1/00; H02J 7/00; H02J 7/0029; B60R 16/03; B60R 16/033
See application file for complete search history.

(56) References Cited

U.S. PATENT DOCUMENTS

2011/0194277 A1* 8/2011 Yamaguchi ............... H02J 7/34
362/183
2017/0079094 A1* 3/2017 Okita ....................... H02M 1/08

FOREIGN PATENT DOCUMENTS

| JP | H07194027 A | 7/1995 |
|----|-------------|--------|
| JP | 4053447 B2 | 2/2008 |
| JP | 2009183020 A | 8/2009 |

(Continued)

*Primary Examiner* — Rexford N Barnie
*Assistant Examiner* — Thai H Tran
(74) *Attorney, Agent, or Firm* — Harness, Dickey & Pierce, P.L.C.

(57) ABSTRACT

A reverse current protection circuit includes a MOSFET and an on/off controller. When the on/off controller applies an on-state control voltage to a gate of the MOSFET, a main power supply input through a main power supply line is output to a common connection node via the MOSFET; and when an off-state control voltage is applied to the gate of the MOSFET, the electrical connection between the main power supply line and the common connection node is interrupted to prevent a reverse current. A diode is connected to enable a forward current flowing from a sub power supply line to the common connection node and the reverse current is prevented. The voltage drop of the main power supply, when the on-off controller applies the on-state control to the gate of the MOSFET, is lower than the voltage drop of the sub power supply through the diode.

4 Claims, 8 Drawing Sheets

(56) References Cited

FOREIGN PATENT DOCUMENTS

| JP | 2010098827 A | 4/2010 |
|---|---|---|
| JP | 2013215095 A | 10/2013 |

* cited by examiner

POWER SUPPLY SYSTEM

CROSS REFERENCE TO RELATED APPLICATIONS

This application is a U.S. National Phase Application under 35 U.S.C. 371 of International Application No. PCT/JP2017/007135 filed on Feb. 24, 2017. This application is based on and claims the benefit of priority from Japanese Patent Application No. 2016-071660 filed on Mar. 31, 2016. The entire disclosures of all of the above applications are incorporated herein by reference.

TECHNICAL FIELD

The present disclosure relates to a power supply system that supplies power through a main power supply line and a sub power supply line.

BACKGROUND ART

A vehicle (such as a car), for example, carries many electronic control units (ECU), and various control processes are carried out by coordinated operation of these ECUs. Power is supplied to these ECUs via power supply lines branched from a battery power supply. For higher operation safety, some of these ECUs need to be kept operating by supplying power from another sub power supply (e.g., auxiliary battery) via a sub power supply line in the event of an abnormality occurring in a battery power supply that is the main power supply or in the supply line of this main power supply. In such a case, power can be supplied to one ECU from a main power supply line and a sub power supply line via a diode-OR circuit (see, for example, Patent Literature 1). This technique can prevent reverse flow of current from the sub power supply line to the main power supply line.

When power is supplied to one ECU from the main power supply line and the sub power supply line via a diode-OR circuit, even if a plurality of diodes are designed to have the same value of forward voltage, there may be production variation in the forward voltage. In this case it is not known which diode power is supplied through. Therefore, when a diode-OR circuit is used, it is necessary to configure various circuits such that both of the main power supply line and the sub power supply line can accommodate the total supply current, and accordingly the sub power supply may have an unnecessarily large-scale circuit configuration. Patent Literature 1 attempts to solve this difficulty by adjusting the voltages of the main power supply and sub power supply.

Prior Art Literatures

PATENT LITERATURE

Patent Literature 1: JP 4053447 B2

SUMMARY

However, the system that uses a diode-OR circuit for preventing reverse current flow as in Patent Literature 1 is not suited to low-voltage operation because of the large forward voltage drop. To enable low-voltage operation while using the diode-OR circuit, the internal power supply circuit is configured by a relatively expensive power source circuit such as a step-up and step-down power supply circuit and the like that can tolerate low voltage input, which is not preferable.

The present disclosure was made in consideration of the circumstances described above, its object being to provide a power supply system capable of keeping voltage of a main power supply as high as possible even when the voltage input from the main power supply via the main power supply line is low, and capable of supplying power reliably from a sub power supply line even when the main power supply line fails to supply power.

One aspect of the present disclosure is directed to a power supply system that supplies power from a main power supply input from a main power supply line and from a sub power supply input from a sub power supply line via one common connection node. The reverse current protection circuit includes a MOSFET and an on/off controller. When the on/off controller applies an on-state control voltage to the gate of the MOSFET, the power from the main power supply input from the main power supply line is output to the common connection node via the MOSFET. When the on/off controller applies an off-state control voltage to the gate of the MOSFET, electrical connection between the main power supply line and the common connection node is shut off to prevent current from flowing reversely.

The diode is connected such that a forward current flows from the sub power supply line to the common connection node and does not flow reversely. Therefore, when power is not supplied from the main power supply via the main power supply line, the sub power supply can supply power from the sub power supply line via the common connection node.

The voltage drop on the main power supply from the main power supply line to the common connection node when the on/off controller applies an on-state control voltage to the gate of the MOSFET is lower than the voltage drop on the sub power supply from the sub power supply line to the common connection node via the diode. Therefore, the voltage of the main power supply supplied via the common connection node can be maintained as high as possible even when the voltage input from the main power supply via the main power supply line is low. As current can be conducted from the main power supply line in the normal state, the amount of current flowing through the sub power supply line can be limited, so that an unnecessary increase in the circuit configuration for the sub power supply can be prevented.

BRIEF DESCRIPTION OF DRAWINGS

The above and other objects, features and advantages of the present disclosure will become more apparent from the following detailed description made with reference to the accompanying drawings. In the drawings.

EMBODIMENTS

Several embodiments of the power supply system will be described below with reference to the drawings. Same or similar numerals are given to components that carry out the same or similar operation in various embodiments, and description thereof will be suitably omitted. The same or similar components in the embodiments below are given like numerals in their tens and ones places in the following description.

(First Embodiment)

Figure 1:
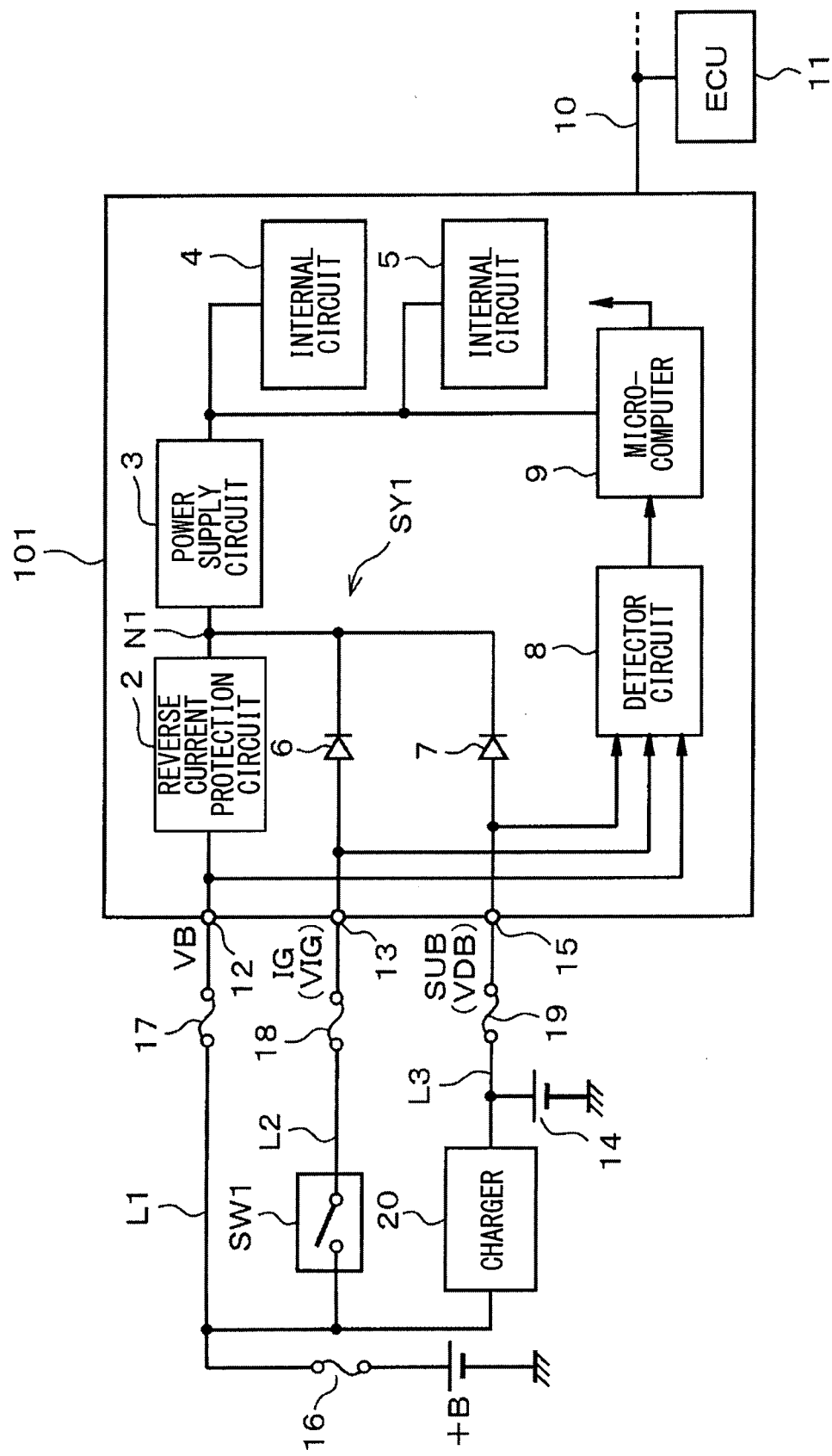
FIG. 1 is a block diagram illustrating an electrical configuration in a first embodiment.
Figure 2:
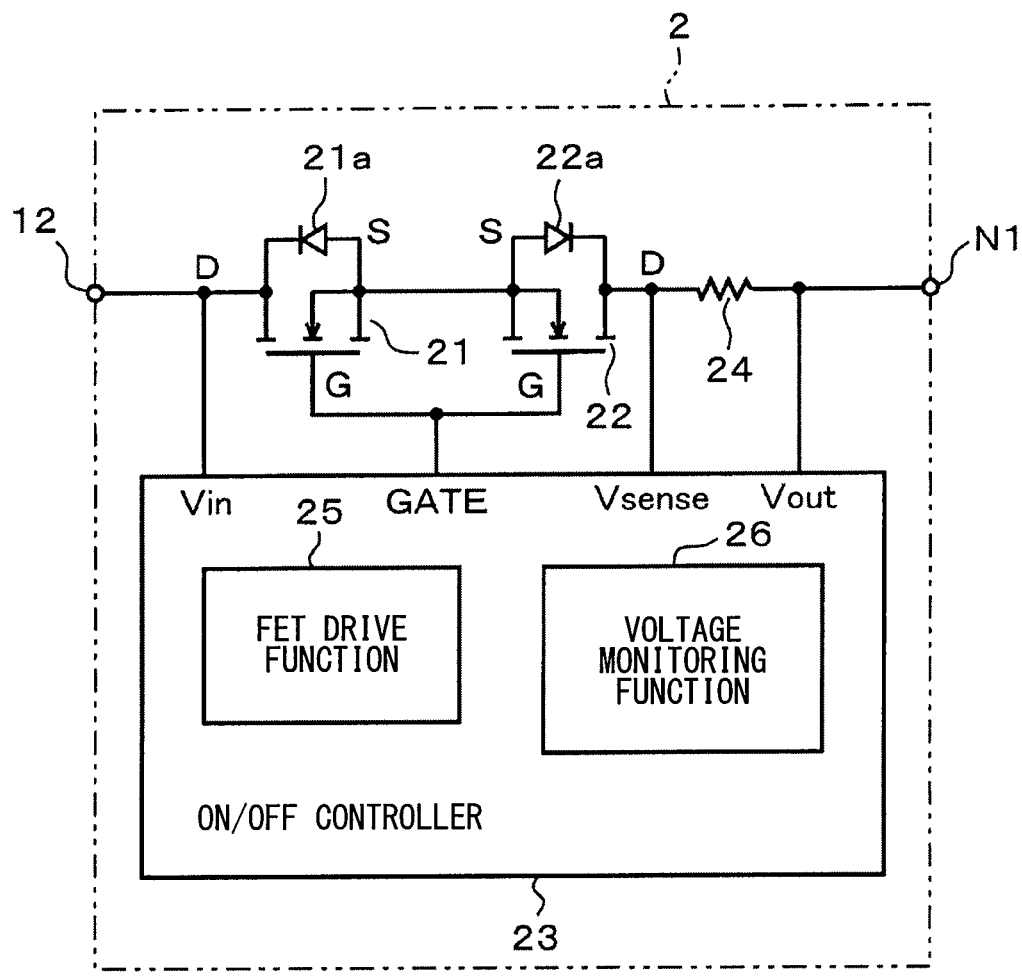
FIG. 2 is an electrical configuration diagram of a reverse current protection circuit.
Figure 3:
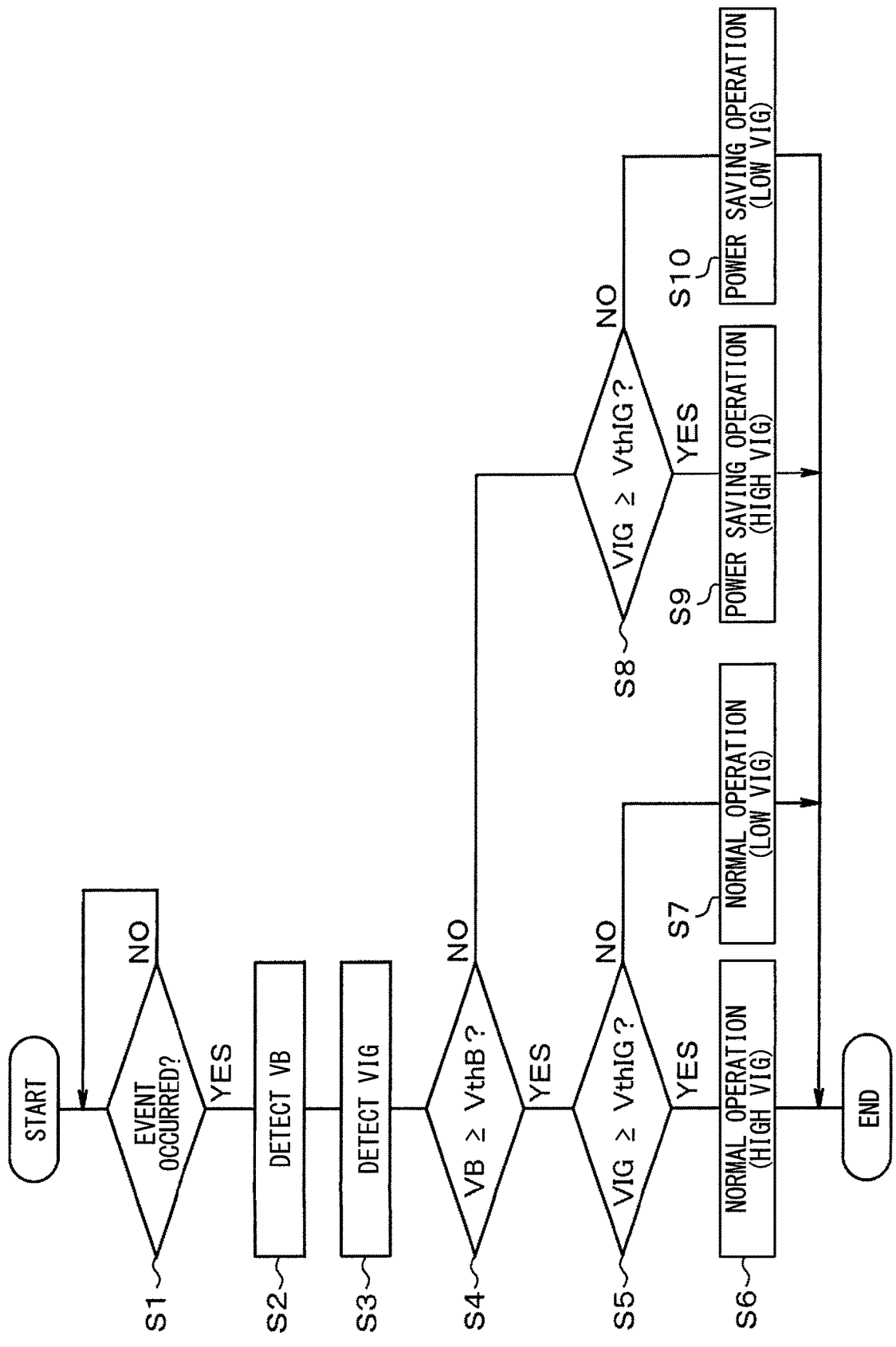
FIG. 3 is a flowchart showing the details of the process of switching over between a normal operation mode and a power saving mode.

FIG. 1 to FIG. 3 show illustrative diagrams of a first embodiment. FIG. 1 shows an electrical configuration of an integrated electronic control unit (hereinafter referred to as "integrated ECU") and its peripheral configuration. An integrated ECU 101 includes a reverse current protection circuit 2, a power supply circuit 3, internal circuits 4 and 5, diodes 6 and 7, a detector circuit 8, and a microcomputer 9. A power supply system SY1 is configured to include the reverse current protection circuit 2 and diodes 6 and 7, with the power supply circuit 3 being connected in a subsequent stage.

The internal circuits 4 and 5 represent some of the functions of the integrated ECU 101 and are configured as operating circuits. For example, the internal circuit 4 represents functions legally required for controlling the drive of the vehicle (such as a meter control function), or functions for performing an operation that is related to safety inside the vehicle and prevents an accident or becomes essential when a vehicle failure occurs (such as air bag control), which will be hereinafter suitably referred to as "driving/safety functions". The internal circuit 5 represents information-related functions such as navigation ECU and audio ECU (hereinafter suitably referred to as "general functions").

The integrated ECU 101 is connected to an in-vehicle network 10 such as CAN or LIN. The microcomputer 9 includes a CPU, ROM, RAM, back-up RAM, EEPROM, I/O, and A/D converter circuit (none shown), for example, and is configured as an operating circuit or a controller. When power is supplied from the power supply circuit 3, the microcomputer 9 can acquire various information from sensors (not shown) connected to the integrated ECU 101 itself (such as acceleration pedal operation information, steering wheel operation information, brake operation information, vehicle speed information, vehicle door open/close information, etc). Alternatively, these information may be acquired from sensors and the like connected to another ECU 11 connected to the in-vehicle network 10.

The integrated ECU 101 includes an input terminal 12 for voltage VB from a battery power supply +B that is the main power supply, an input terminal 13 for voltage VIG from an ignition power supply IB that is a sub power supply, and an input terminal 15 for voltage VSUB from an auxiliary battery 14 that is a sub power supply.

The battery power supply +B has a main fuse 16 connected thereto, and the battery power supply +B is connected to a main power supply line L1 via the fuse 16. A fuse 17 is connected between the main power supply line L1 and the input terminal 12 so that voltage VB of the battery power supply +B is applied to the input terminal 12 via the fuse 17. The battery power supply +B is the power supply that inputs voltage VB to the input terminal 12 irrespective of whether the key switch SW1 is on or off.

The input terminal 13 is connected to a sub power supply line L2 via a fuse 18 outside the integrated ECU 101. The key switch SW1 is connected between the main power supply line L1 and the sub power supply line L2 so that voltage VIG is applied to the input terminal 13 via the key switch SW1 and the fuse 18. The power supply of the applied voltage VIG will be referred to as "ignition power supply" IG. Although not shown, the key switch SW1 can be operated by a user to take on various states such as OFF, ACC, ON, and START, for example. Starter control signals of the key switch SW1 (ON, ON in the START state, OFF, and OFF in the ACC state) are input to the microcomputer 9 of the integrated ECU 101. The ignition power supply IG is the power supply that outputs power when the key switch SW1 is in the ON or START position. In other words, the ignition power supply IG is turned on and off as the user of the vehicle operates the key switch SW1.

The input terminal 15 is connected to a sub power supply line L3 via a fuse 19. The auxiliary battery 14 is connected to the sub power supply line L3. A charger 20 is connected between the main power supply line L1 and the sub power supply line L3. The charger 20 charges the auxiliary battery 14 using the voltage of the battery power supply +B. The auxiliary battery 14 supplies voltage VSUB to the input terminal 15 via the fuse 19 for supplementing power for operations. This applied voltage in particular will be referred to as "charging power supply" SUB. The charging power supply SUB is the power supply that provides power to the input terminal 15 when the auxiliary battery 14 is charged to a preset voltage irrespective of whether the key switch SW1 is on or off.

The diode 6 is connected between the input terminal 13 and an input node N1 of the power supply circuit 3. The diode 6 is connected to have its anode on the side of the input terminal 13 and its cathode on the side of the input node N1 of the power supply circuit 3. The diode 7 is connected between the input terminal 15 and the input node N1 of the power supply circuit 3. The diode 7 is connected to have its anode on the side of the input terminal 15 and its cathode on the side of the input node N1 of the power supply circuit 3.

The reverse current protection circuit 2 is connected between the input terminal 12 and the input node N1 of the power supply circuit 3. As shown in the configuration example of the reverse current protection circuit 2 in FIG. 2, the reverse current protection circuit 2 is formed by MOSFETs 21 and 22, and an on/off controller 23. The reverse current protection circuit 2 is configured to include two N-channel MOSFETs 21 and 22, for example, having mutually connected gates G, and a sensing resistor 24 that detects current flowing from these MOSFETs 21 and 22 to the node N1, as shown in FIG. 2. The two MOSFETs 21 and 22 are connected in series between the input terminal 12 and the node N1 such that their sources are connected to each other and their polarities are opposite from each other. The node N1 is a common connection node connected to the cathodes of the diodes 6 and 7 and the output of the reverse current protection circuit 2.

The configuration example shown in FIG. 2 will be described in detail. The reverse current protection circuit 2 is configured to have the drain D and source S of the MOSFET 21, the source S and drain D of the MOSFET 22, and the sensing resistor 24 connected in series between the input terminal 12 and the node N1. The MOSFET 21 includes a parasitic diode 21a in the forward direction from the source S to the drain D in the internal semiconductor structure. The MOSFET 22 includes a parasitic diode 22a in the forward direction from the source S to the drain D in the internal semiconductor structure. With this configuration, the polarities are opposite. The MOSFETs 21 and 22 respectively have the parasitic diodes 21a and 22a connected in opposite directions so as to shut off the current path through both parasitic diodes 21a and 22a. In this way, even when the voltage of the node N1 becomes higher than the voltage of the input terminal 12 when the MOSFETs 21 and 22 are off, there is no possibility that a large current conducts through the parasitic diodes 21a and 22a to the input terminal 12 on the input side of the reverse current protection circuit 2.

The on/off controller 23 includes an FET drive function 25 and a voltage monitoring function 26. The on/off controller 23 drives the gates of the MOSFETs 21 and 22 from a GATE terminal by the FET drive function 25. The on/off controller 23 detects input voltage Vin of the input terminal 12, voltage Vsense of the common connection node between the drain of the MOSFET 22 and the sensing resistor 24, and voltage Vout of the node N1 by the voltage monitoring function 26. The on/off controller 23 drives the MOSFETs by applying a predetermined on-state control voltage Vcon (e.g., Vcon>VB so that VGS will be equal to or more than a threshold Vth), or an off-state control voltage Vcoff (e.g., Vcoff=0<VB so that VGS will be less than a threshold Vth) to the gates of the MOSFETs 21 and 22 by the FET drive function 25, based on the voltages Vin, Vsense, and V out.

The power supply circuit 3 shown in FIG. 1 is configured by a step-down power supply circuit 3, for example, so that the voltage applied to the input node N1 of the power supply circuit 3 is lowered to a preset level and then is supplied to the internal circuits 4 and 5 and the microcomputer 9. The power supply circuit 3 may be configured using a step-up power supply circuit. It is preferable, however, to use a step-down power supply circuit, for preventing an increase in cost, for example. The internal circuits 4 and 5 and microcomputer 9 operate using the power supply voltage of the power supply circuit 3.

The detector circuit 8 is a circuit block that detects voltage of each of the input terminals 12, 13, and 15, and is configured by a detector IC including a comparator, for example. The detector circuit compares the detected voltage with each predetermined threshold voltage VthB, VIG, and so on and outputs the comparison results to the microcomputer 9. The detector circuit 8 may sometimes use the voltage of the power supply circuit 3, but the connection line is omitted in FIG. 1.

The microcomputer 9 controls the switching between a normal operation mode and a power saving mode in accordance with the comparison results from the detector circuit 8. The detector circuit 8 may be configured by an A/D converter circuit built in the microcomputer 9. In this case, the microcomputer 9 can control the switching between the normal operation mode and the power saving mode in accordance with the conversion results of the A/D converter circuit.

The microcomputer 9 has a sleep mode, a normal operation mode, and a power saving mode. The microcomputer 9 goes to sleep in the sleep mode, operates normally in the normal operation mode, and operates at a lower power than the normal operation in the power saving mode. When the microcomputer 9 is a multicore microcomputer, for example, the microcomputer 9 assigns tasks to all the cores in the normal operation mode, while the microcomputer 9 stops the task operation of some cores in the power saving mode. Alternatively, the microcomputer 9 may change the operating clock to a lower frequency in the power saving mode than in the normal operation mode, or lower the operating power supply voltage than that of the normal operation mode.

The internal circuit 5 also has a normal operation mode and a power saving mode. The internal circuit 5 operates normally in the normal operation mode, and operates at a lower power than the normal operation in the power saving mode. The switching between these modes may be carried out by the control by the microcomputer 9, or by the internal circuit 5 itself based on the power supply voltage input from the power supply circuit 3. The internal circuit need not necessarily include these normal operation mode and power saving mode.

When the internal circuit 5 includes a navigation function for connecting a display device, for example, the internal circuit 5 controls the brightness of the display screen of the display device to be lower in the power saving mode. Thus power can be saved in the power saving mode as compared to the normal operation mode. When the internal circuit 5 includes an audio function for outputting sound, for example, such function may be limited, for example, by lowering the sound output volume, to save power. The internal circuit 4 may also have a normal operation mode and a power saving mode, description of which will be omitted.

First, the operation of the reverse current protection circuit 2 shown in FIG. 2 in the configuration described above will be explained. When the battery power supply +B outputs battery voltage VB, the reverse current protection circuit 2 inputs the battery voltage VB as input voltage Vin via the input terminal 12. The input voltage Vin is given to the drain of the MOSFET 21. Voltage equivalent to the input voltage Vin is then generated at the sources of the MOSFETs 21 and 22 based on the reverse leakage current of the parasitic diode 21a between the drain and the source of the MOSFET 21.

The source voltage of these MOSFETs 21 and 22 is applied also to the drain D of the MOSFET 22 via the parasitic diode 22a of the MOSFET 22. Therefore, when battery voltage VB is input to the input terminal 12 in the normal state, voltage that is lower than the battery voltage VB is generated at the common source S of the MOSFETs 21 and 22 and the drain D of the MOSFET 22.

After that, the on/off controller 23 applies a predetermined on-state control voltage that is higher than the input voltage Vin (e.g., so that VGS will be equal to or more than the threshold Vth) to the gates G of the MOSFETs 21 and 22 in the normal state. Both MOSFETs 21 and 22 are thereby turned on, so that the on-current flows into the input node N1 of the power supply circuit 3 from the input terminal 12 via the drain-source of the MOSFET 21 and the source-drain of the MOSFET 22.

When, on the other hand, the key switch SW1 is turned on, voltage VIG of the ignition power supply IG is given to the input node N1 of the power supply circuit 3 via the input terminal 13 and diode 6. The charger 20 charges the auxiliary battery 14 with the voltage of the battery power supply +B. Voltage VSUB of the charging power supply SUB is input to the input node N1 of the power supply circuit 3 via the input terminal 15 and diode 7.

The voltage drop across the reverse current protection circuit 2 equals to the sum of the drain-source voltages VDS of the two MOSFETs 21 and 22. For example, when battery voltage VB is low (e.g., 4V), with the on-state resistance of the two MOSFETs being Ron1+Ron2=40 mΩ and the current being 2.5A, the drain-source voltage VDS is 0.1 V.

In this case, the voltage of the input node N1 of the power supply circuit 3 is 3.9 V. Meanwhile, the forward voltage Vf of the diodes 6 and 7 is about 1 V. The voltage drop across the reverse current protection circuit 2 can thus be made lower than the forward voltage Vf of the diodes 6 and 7, so that, while current can conduct through the reverse current protection circuit 2 from the main power supply line L1 in the normal state, the current that flows through the sub power supply lines L2 and L3 can be minimized (e.g., 0 A). When battery voltage VB undergoes sudden fluctuations in response to load fluctuations of the battery power supply +B, the charging power supply SUB may supply supplementary power to the power supply circuit 3 via a sub power supply line (e.g., L3).

In the normal state, the voltage of the input terminal 12 is equal to or higher than the voltage of the input node N1 of the power supply circuit 3. The on/off controller 23 in this state detects voltage by the voltage monitoring function 26 in the following manner.

$$Vin \geq Vsense \quad (1\text{-}1)$$

$$Vin \geq Vout \quad (1\text{-}2)$$

$$Vsense \geq Vout \quad (1\text{-}3)$$

If all of the conditions (1-1) to (1-3) are satisfied, the on/off controller 23 keeps applying the on-state control voltage Vcon to the gates of the MOSFETs 21 and 22. Thus, power can be supplied to the power supply circuit 3 via the main power supply line L1.

Assumed that the fuse 17 has melted down because of a large current flowing through the main power supply line L1 due to some influence. When the fuse 17 melts down, the main power supply line L1 is broken, so that power stops to be supplied from the battery power supply +B to the input terminal 12 on the input side of the reverse current protection circuit 2. However, the ignition power supply IG is supplying power to the power supply circuit 3 via the sub power supply line L2, and the charging power supply SUB is supplying power to the power supply circuit 3 via the sub power supply line L3. The power supply circuit 3 can thus keep the power supply function, although the amount of current to be supplied to the microcomputer 9 and internal circuits 4 and 5 is reduced.

Meanwhile, the voltage of the input terminal 12 is lowered (e.g., 0 V). The voltage of the input terminal 12 becomes lower than the voltage of the input node N1 of the power supply circuit 3. When the MOSFETS 21 and 22 are on, for example, the current flows reversely from the normal operation. When current flows reversely from the node N1 to the input terminal 12, the on/off controller 23 of the reverse current protection circuit 2 detects voltage that satisfies the following conditions:

$$Vin < Vsense \quad (2\text{-}1)$$

$$Vin < Vout \quad (2\text{-}2)$$

$$Vsense < Vout \quad (2\text{-}3)$$

If one or more, or all of these conditions (2-1) to (2-3) are satisfied, the on/off controller 23 determines that there is a possibility of reverse current flow, and applies an off-state control voltage Vcoff (e.g., 0 V) to the gates of the MOSFETs 21 and 22 so that the gate-source voltage VGS of the MOSFETs 21 and 22 is equal to or lower than the threshold Vth. The electrical connection between the main power supply line L1 and the node N1 can thereby be shut off, so that reverse flow of current is prevented.

As an alternative to the conditions (2-1) to (2-3), the following conditions (3-1) to (3-3) with some expected voltage margin VA may be used as the basis for the determination.

$$Vin + VA < Vsense \quad (3\text{-}1)$$

$$Vin + VA < Vout \quad (3\text{-}2)$$

$$Vsense + VA < Vout \quad (3\text{-}3)$$

The voltage margin VA here can be determined as VA=Ir× R, where Ir represents tolerable reverse current Ir. The resistance R can be expressed using the on-state resistances Ron1 and Ron2 of the MOSFETs 21 and 22, so that the voltage margin VA can be determined as VA=Ir× (Ron1+ Ron2). If one or more, or all of these conditions (3-1) to (3-3) are satisfied, the on/off controller 23 determines that reverse flow of current has been detected, and applies an off-state control voltage Vcoff (e.g., 0 V) so that the gate-source voltage VGS of the MOSFETs 21 and 22 is lower than the threshold Vth. Reverse current flow can thus be prevented. As the reverse current protection circuit 2 prevents reverse current flow, the voltage applied to the node N1 is input to the power supply circuit 3 without being affected by the reverse current protection circuit 2. When the recommended operating power supply voltage of the internal circuits 4 and 5 and the microcomputer 9 is 3.3 V, for example, an inexpensive step-down power supply circuit can be used as the power supply circuit 3 to consistently generate a sufficient power supply voltage.

Next, the process of switching over between the normal operation mode and the power saving mode by the microcomputer 9 will be described with reference to FIG. 3. In the following description, the threshold to be used as the basis for determination of abnormality in battery voltage VB will be referred to as threshold voltage VthB, and the threshold to be used as the basis for determination of voltage of the ignition power supply IG as threshold voltage VthIG.

For convenience of explanation, in the example described below, the normal operation mode and the power saving mode are switched over based on battery voltage VB and voltage VIG of the ignition power supply IG. The voltage of the charging power supply SUB may be added to the conditions in the example described below.

The microcomputer 9 starts operating based on a program stored in an internal memory when power is supplied from the power supply circuit 3. As shown in FIG. 3, the microcomputer 9 detects whether or not an event has occurred at step S1, and, if the microcomputer 9 detects occurrence of an event, the microcomputer 9 performs the process from the step S2 onwards. Occurrence of an event here may refer to, for example, detection of a start-up factor such as turning-on of the key switch SW1, or detection of a timer interrupting process at regular interval in the normal operation mode.

The detector circuit 8 detects battery voltage VB at step S2, and detects voltage VIG of the ignition power supply IG at step S3. The detector circuit 8 compares these voltages VB and VIG with predetermined threshold voltages VthB and VthIG, and outputs the comparison results to the microcomputer 9.

When the microcomputer 9 determines at step S4 that battery voltage VB is equal to or more than the threshold voltage VthB, and determines at step S5 that voltage VIG of the ignition power supply IG is equal to or more than the threshold voltage VthIG, the microcomputer starts operating in the normal operation mode at step S6. The microcomputer 9 at this time determines that the ignition power supply IG is in a high-voltage state, so that it can be determined that the ignition power supply IG is in a normal state in which it is capable of supplying power.

When battery voltage VB is determined to be equal to or more than the threshold voltage VthB at step S4, and voltage VIG of the ignition power supply IG is determined to be less than the threshold voltage VthIG, the microcomputer 9 starts operating normally at step S7. At this time, the microcomputer 9 can recognize that the ignition power supply IG is in a low-voltage state.

Namely, when battery voltage VB is not less than the threshold VthB, the microcomputer 9 determines that it has the capacity to operate in the normal state. When the voltage of the ignition power supply IG is lower than the threshold VthIG and when the starter control signal of the key switch SW1 indicates "off" (meaning the key switch SW1 is either in the OFF state or ACC state), the microcomputer 9 operates in the normal operation mode while determining that there is no starter start-up factor by the key switch SW1.

When the microcomputer 9 determines at step S4 that battery voltage VB of the battery power supply +B is lower than the threshold voltage VthB, and determines at step S8 that voltage VIG of the ignition power supply IG is equal to or more than the threshold voltage VthIG, the microcomputer starts operating in the power saving mode at step S9 while recognizing that the ignition power supply IG is in the high-voltage state.

In this case, it is expected that a failure has occurred in the supply system from the battery power supply +B to the main power supply line L1, or that the fuse 17 has melted down and the power supply from the main power supply line L1 is interrupted, so that the integrated ECU 101 operates by the voltage VIG of the ignition power supply IG. In this case, the microcomputer 9 causes at least itself to operate in the power saving mode.

In this power saving mode, the microcomputer 9 may cause the internal circuit 4 having safety/driving functions to operate such as to exhibit its functions as in the normal operation mode, while causing the other internal circuit 5 to stop some of its functions in the power saving mode. Alternatively, all the functions of the internal circuit 5 may be stopped. If the fuse 18 of the sub power supply line L2 has a sufficiently high breaking capacity, the other internal circuit 5 may be allowed to operate to exhibit its functions as required. Current consumption can be reduced this way by the microcomputer 9 (and internal circuit 5) operating in the power saving mode, so that the fuse 18 for the ignition power supply IG need not have a large breaking capacity.

When, for example, integrated ECUs 101 with the internal circuit 4 having driving/safety functions are shipped abroad for a long period of time by a transport operator, the fuse 17 mainly for the main power supply line L1 is removed so that power from the battery power supply +B is not supplied to the internal circuits of the integrated ECU 101. This is for preventing deterioration of the battery power supply +B caused by the power supply circuit 3, microcomputer 9 and internal circuits 4 and 5 consuming dark current (sleep current).

After that, when the transport operator moves the transported vehicle from the destination by driving the vehicle, driving functions such as meter equipment need to be operable as legally required, for example. In some cases, while the fuse 17 is still removed, only the ignition power supply IG may be used for the operation, power being supplied via the fuse 18 from the battery power supply +B. In such a case, the microcomputer 9 of the integrated ECU 101 causes the system to operate in the power saving mode while determining that the ignition power supply IG is in the high-voltage state at step S9.

It is advantageous if, even in such a case where the transport operator has to drive the vehicle temporarily, the microcomputer 9 senses this situation and causes itself to operate in the power saving mode, while allowing the internal circuit 4 having driving functions to exhibit its functions and stopping some or all of the functions of the other internal circuit 5.

When the microcomputer 9 determines at step S4 that battery voltage VB is lower than the threshold voltage VthB, and determines at step S8 that voltage VIG of the ignition power supply IG is less than the threshold voltage VthIG, the microcomputer 9 determines at step S10 that the ignition power supply IG is in the low-voltage state and causes the ignition power supply IG to operate in the power saving mode. In this case, the microcomputer 9 is in a sleep mode and waits until the microcomputer 9 receives a start-up request. A plurality of threshold voltages VthIG may be set to allow evaluation at multiple stages.

The operation modes (normal operation mode/power saving mode) of the microcomputer 9 and internal circuit 5 can be switched over in this way in accordance with the conditions of voltage VB of the battery power supply +B and voltage VIG of the ignition power supply IG. Therefore, the fuse 18 for the ignition power supply IG need not have a large breaking capacity.

The characteristic features of this embodiment are summed up in the following. According to this embodiment, the reverse current protection circuit 2 is configured with MOSFETs 21 and 22 and the on/off controller 23. The voltage drop can be reduced as compared to the method of preventing reverse current flow using diodes. Therefore, the drop of voltage VB supplied from the main power supply line L1 to the node N1 can be set lower than the drop of voltage VIG supplied from the sub power supply line L2 to the node N1, so that, even when the voltage of the battery power supply +B has reduced (e.g., 4 V), the voltage of the node N1 supplied to the output of the reverse current protection circuit 2 can be maintained as high as possible (e.g., 3.9 V). As a result, the power supply circuit 3 can consistently supply power to the microcomputer 9 and internal circuits 4 and 5 using the voltage of this node N1. Even when the power supply circuit 3 is formed by a step-down power supply circuit, in particular, power can be consistently supplied to the microcomputer 9 and internal circuits 4 and 5.

The diodes 6 and 7 are connected such that a forward current flows from the sub power supply lines L2 and L3 to the node N1 and does not flow reversely. Accordingly, even when power cannot be supplied via the main power supply line L1, the ignition power supply IG and charging power supply SUB can supply power to the power supply circuit 3 from the sub power supply lines L2 and L3 via the node N1.

In the normal state, current flows steadily from the battery power supply +B into the power supply circuit 3 via the main power supply line L1, fuse 17, and reverse current protection circuit 2, so that supply current flowing through the sub power supply lines L2 and L3 can be limited. The sub power supply lines L2 and L3 can be used as an auxiliary when there are fluctuations in the battery power supply +B, for example.

The on/off controller 23 of the reverse current protection circuit 2 is configured to have a sensing resistor 24 connected thereto, the sensing resistor 24 detecting current flowing through the node N1, and applies an off-state control voltage to the gates of the MOSFETs 21 and 22 on condition that voltage Vsense of the node upstream of the sensing resistor 24 is lower than voltage Vout of the node N1 that is downstream of the sensing resistor 24. Thus, reverse current flow can be prevented. Other conditions where voltage margins VA are taken into account may also be used as the basis for the determination.

The on/off controller 23 of the reverse current protection circuit 2 compares voltage Vin of the input terminal 12 upstream of the MOSFETs 21 and 22 with the voltages Vsense and Vout of the downstream nodes, and applies an off-state control voltage to the gates of the MOSFETs 21 and 22 on condition that voltage Vin of the upstream input terminal 12 is lower than the voltages Vsense and Vout of the downstream nodes. Thus, reverse current flow can be prevented. Other conditions where voltage margins VA are taken into account may also be used as the basis for the determination.

In the event of a fault in the supply system from the battery power supply +B to the main power supply line L1, melting down of the fuse 17, or a fault in the main power supply line L1, or when the fuse 17 for the main power supply line L1 is removed during transportation, the detector circuit 8 detects voltage VB, VIG, and VSUB of each vehicle power supply, and the microcomputer 9 can detect the state mentioned above in accordance with the detected voltage. The microcomputer 9 can minimize the amount of current supplied by the ignition power supply VIG or sub power supply VSUB as much as possible by operating in the power saving mode, and by causing the internal circuit 5 to operate in the power saving mode as required. The integrated ECU 101 can be made to operate such as to exhibit only essential functions for keeping its operation. Accordingly, an increase in the breaking capacity of fuses 18 and 19, and an increase in the size of components such as the auxiliary battery 14 are prevented, so that the system need not have unnecessarily high reliability.

(Second Embodiment)

Figure 4:
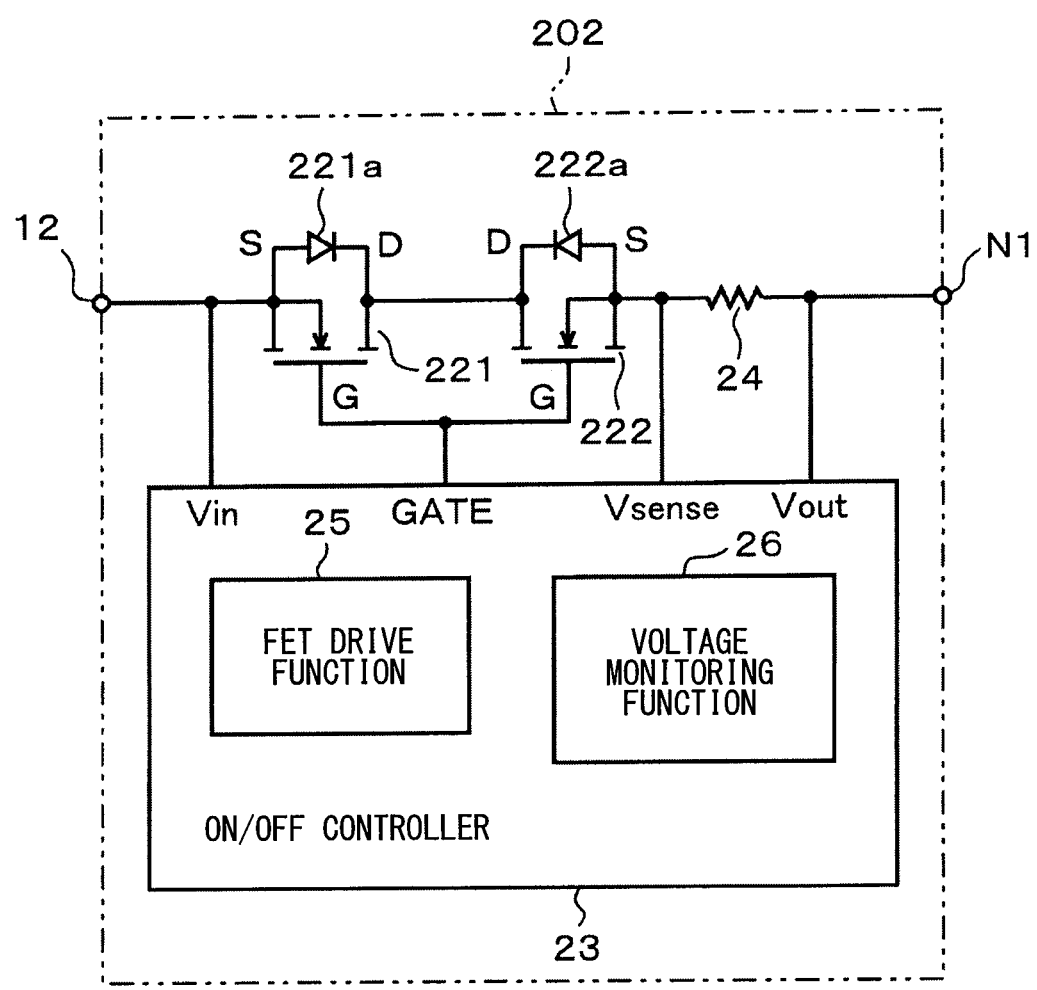
FIG. 4 is an electrical configuration diagram of a reverse current protection circuit in a second embodiment.

FIG. 4 shows an additional illustrative diagram of a second embodiment. The reverse current protection circuit 202 shown in FIG. 4 includes two MOSFETs 221 and 222 and an on/off controller 23. The MOSFETs 221 and 222 are connected in series between the input terminal 12 and the node N1 such that their drains are connected to each other and the polarities are opposite from each other. The node N1 is a common connection node connected to the cathodes of the diodes 6 and 7 and the output of the reverse current protection circuit 202.

Connections are explained in detail. The source S and drain D of the MOSFET 221, the drain D and source S of the MOSFET 222, and the sensing resistor 24 are connected in series between the input terminal 12 and the node N1 of the power supply circuit 3. The MOSFETs 221 includes a parasitic diode 221a in the forward direction from the source S to the drain D in the internal semiconductor structure. The MOSFET 222 includes a parasitic diode 222a in the forward direction from the source S to the drain D in the internal semiconductor structure.

When the reverse current protection circuit 102 inputs battery voltage VB as input voltage Vin, this input voltage Vin is given to the source S of the MOSFET 221, while a voltage equivalent to the input voltage Vin is also applied to the drains of the MOSFETs 221 and 222 via the parasitic diode 221a. The drain voltage of the MOSFETS 221 and 222 is also generated at the source S of the MOSFET 222 because of the influence of reverse leakage current through the parasitic diode 222a from the drain to source of the MOSFET 222. Therefore, when battery voltage VB is input in the normal state, a voltage that is lower than the battery voltage VB is generated at the source S of the MOSFET 222, too.

After that, the on/off controller 23 applies a predetermined on-state control voltage Vcon that is higher than the input voltage Vin to the gates of the MOSFETs 221 and 222 in the normal state. Both MOSFETs 221 and 222 are thereby turned on, so that the on-current flows into the input node N1 of the power supply circuit 3, which is the power supply node, from the input terminal 12 via the source-drain of the MOSFET 221 and the drain-source of the MOSFET 222. On the other hands, the on/off controller 23 applies an off-state control voltage to the gates of the MOSFETs 221 and 222 when voltage conditions (one of (2-1) to (2-3) or one of (3-1) to (3-3)) in the previously described embodiment are met. The electrical connection between the main power supply line L1 and the node N1 can thereby be shut off, so that reverse flow of current is prevented. Other features are similar to the previously described embodiment and will not be described. The present embodiment can provide similar effects as those of the previously described embodiment.

(Third Embodiment)

Figure 5:
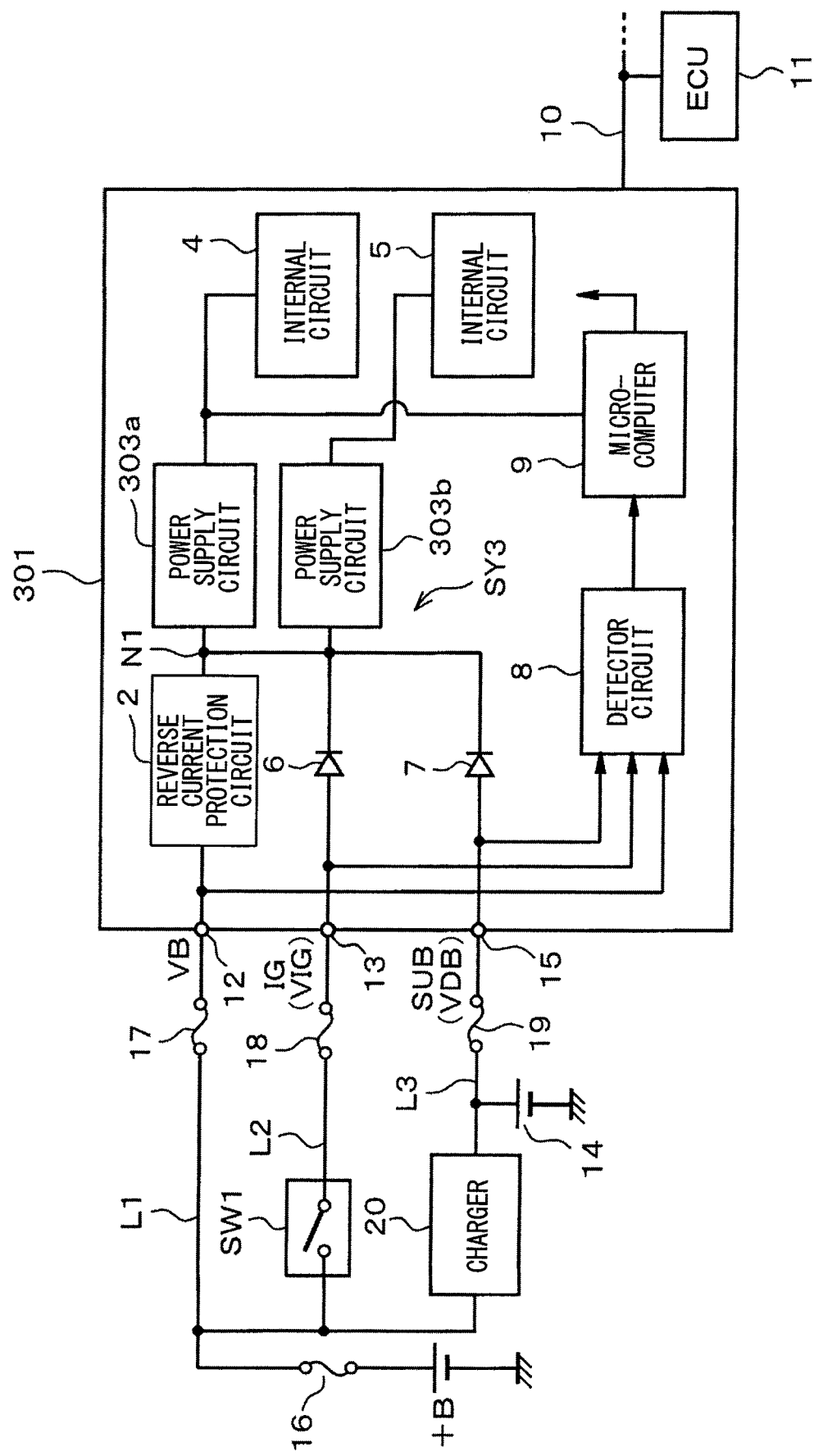
FIG. 5 is a first block diagram illustrating an electrical configuration in a third embodiment.
Figure 6:
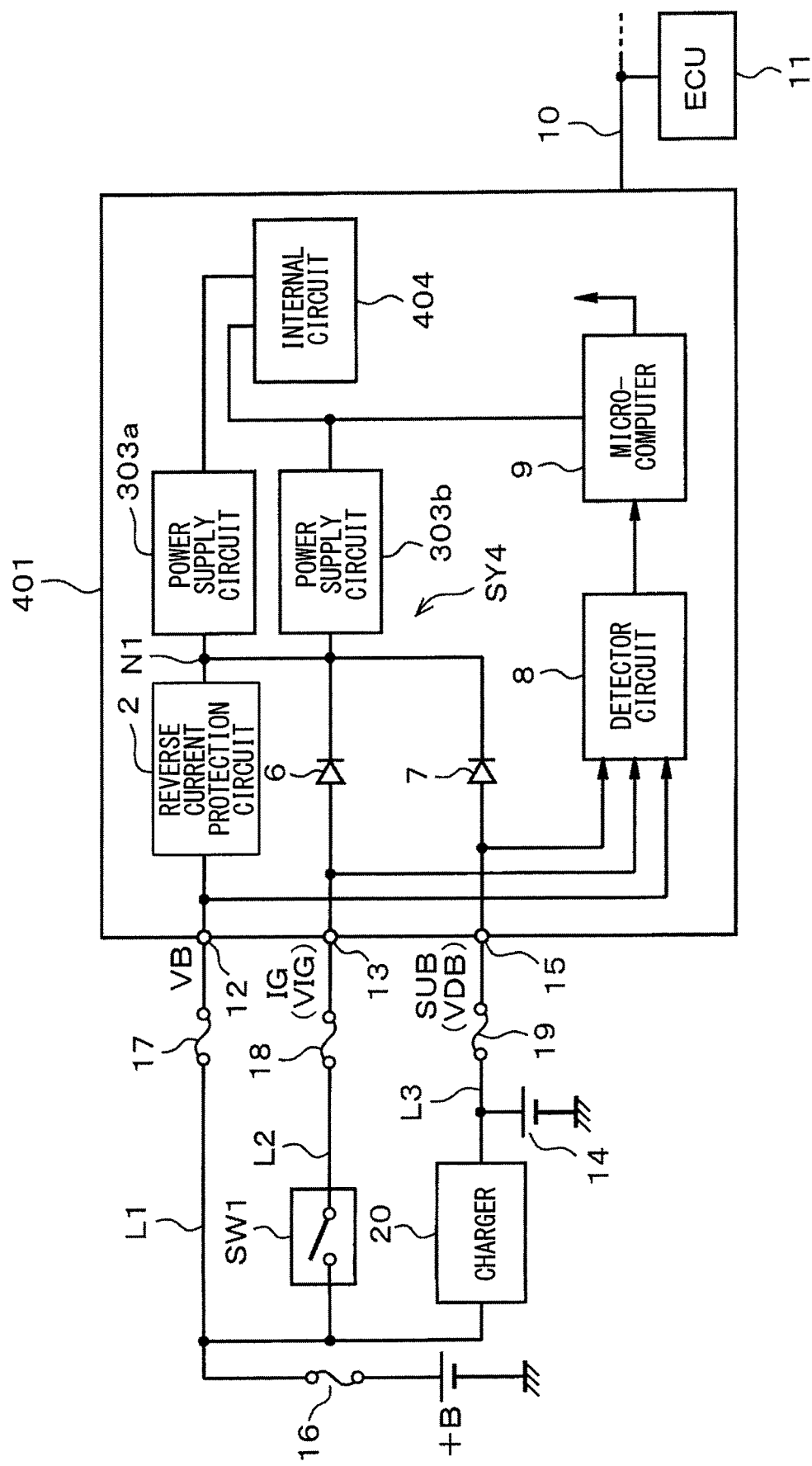
FIG. 6 is a second block diagram illustrating an electrical configuration.

FIG. 5 and FIG. 6 show additional illustrative diagrams of a third embodiment. FIG. 5 shows another configuration example of the integrated ECU 301. The integrated ECU 301 includes a plurality of power supply circuits 303a and 303b instead of the power supply circuit 3. Other features of the integrated ECU 301 are similar to those of the integrated ECU 101 and will not be described. A power supply system SY3 is configured to include the reverse current protection circuit 2 and diodes 6 and 7, with the power supply circuits 303a and 303b being connected in a subsequent stage.

In the integrated ECU 301, the power supply circuit 303a supplies power to the internal circuit 4 having driving/safety functions and to the microcomputer 9, while the power supply circuit 303b supplies power to the internal circuit 5 having general functions, in the normal operation mode. The power supply circuits 303a and 303b output different DC power supply voltages. In such a case, when the microcomputer 9 turns the internal circuit 5 to the power saving mode, the current supply function of the power supply circuit 303b to the internal circuit 5 may be lowered as compared to that of the normal operation mode, or the power supply path from the power supply circuit 303b to the internal circuit 5 may be shut off.

FIG. 6 shows another configuration example of an ECU 401 as an alternative to the integrated ECU 101. The ECU 401 includes a plurality of power supply circuits 303a and 303b instead of the power supply circuit 3, and the power supply circuits 303a and 303b supply power to an internal circuit 404 having driving/safety functions or general functions, for example. A power supply system SY4 is configured to include the reverse current protection circuit 2 and diodes 6 and 7, with the power supply circuits 303a and 303b being connected in a subsequent stage. In such a case, when the microcomputer 9 turns the internal circuit 404 to the power saving mode, the current supply function of the power supply circuit 303b to the internal circuit 404 may be lowered as compared to that of the normal operation mode.

(Fourth Embodiment)

Figure 7:
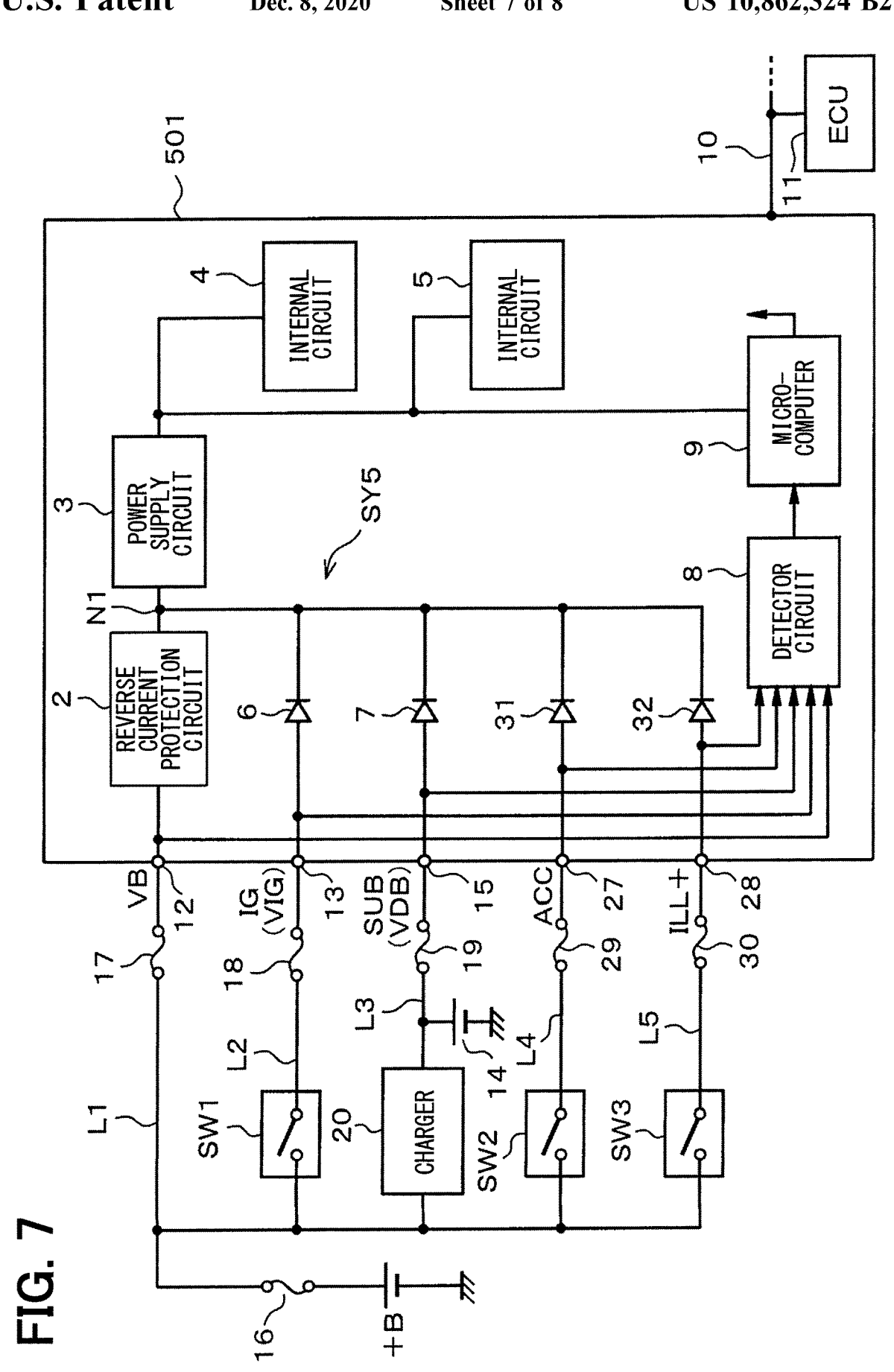
FIG. 7 is a block diagram illustrating an electrical configuration in a fourth embodiment.

FIG. 7 shows an additional illustrative diagram of a fourth embodiment. The functions described in the previous embodiments are also applicable when many other vehicle power supplies (e.g., accessary power supply ACC, illumination power supply ILL+) are used as sub power supplies.

For example, as shown in FIG. 7, a key switch SW2 is connected between the main power supply line L1 and a sub power supply line L4, and when the key switch SW2 is turned on by a user operation, the accessary power supply ACC is input to the input terminal 27 via a fuse 29 as a sub power supply to the integrated ECU 101. The key switch SW2 is a switch that is turned on when the key switch SW1 is at ACC or ON position, for example. The accessary power supply ACC is a power supply that outputs power when this key switch SW2 is turned on.

A key switch SW3 is connected between the main power supply line L1 and a sub power supply line L5, and when the key switch SW3 is turned on by a user operation, the illumination power supply ILL+ is input to the input terminal 28 via a fuse 30 as a sub power supply to the integrated ECU 101. The illumination power supply ILL+ is a power supply that outputs power when a small lamp inside the vehicle is turned on.

A diode 31 is connected in forward direction between the input terminal 27 and the node N1. A diode 32 is connected in forward direction between the input terminal 28 and the node N1. A power supply system SY5 is configured to include the reverse current protection circuit 2 and diodes 6, 7, 31, and 32 with the power supply circuit 3 being connected in a subsequent stage. The detector circuit 8 detects voltage of the input terminals 27 and 28. Thus the accessary power supply ACC and illumination power supply ILL+ can be applied as sub power supplies similarly to the previously described embodiments.

(Fifth Embodiment)

Figure 8:
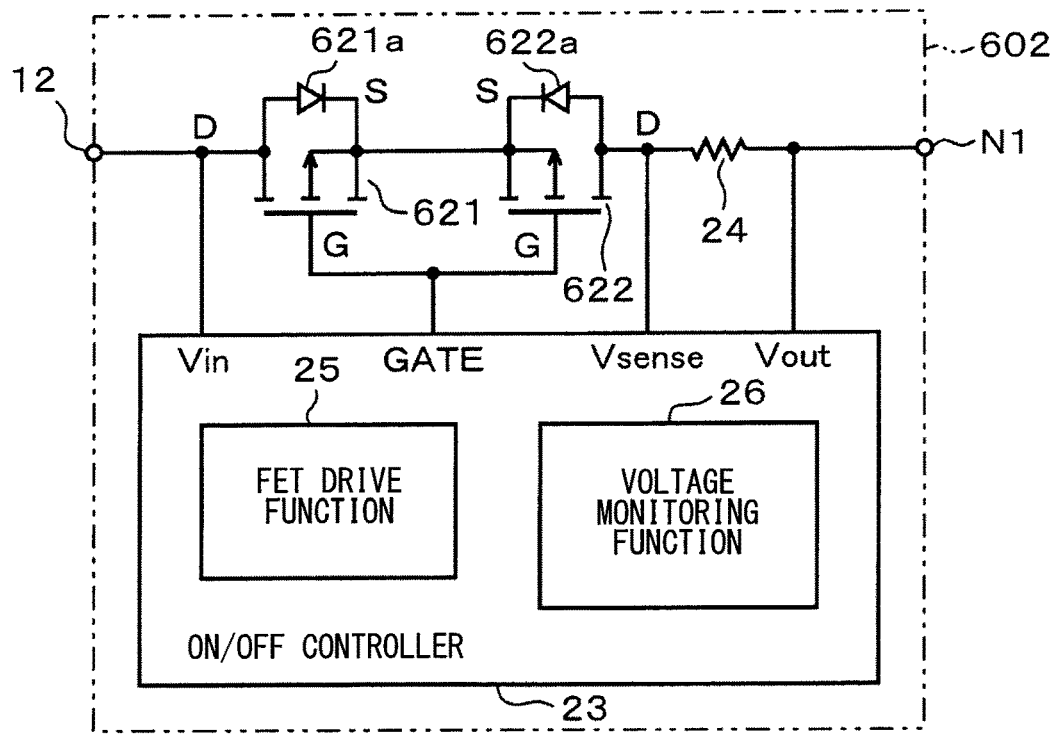
FIG. 8 is a first electrical configuration diagram of a reverse current protection circuit in a fifth embodiment.
Figure 9:
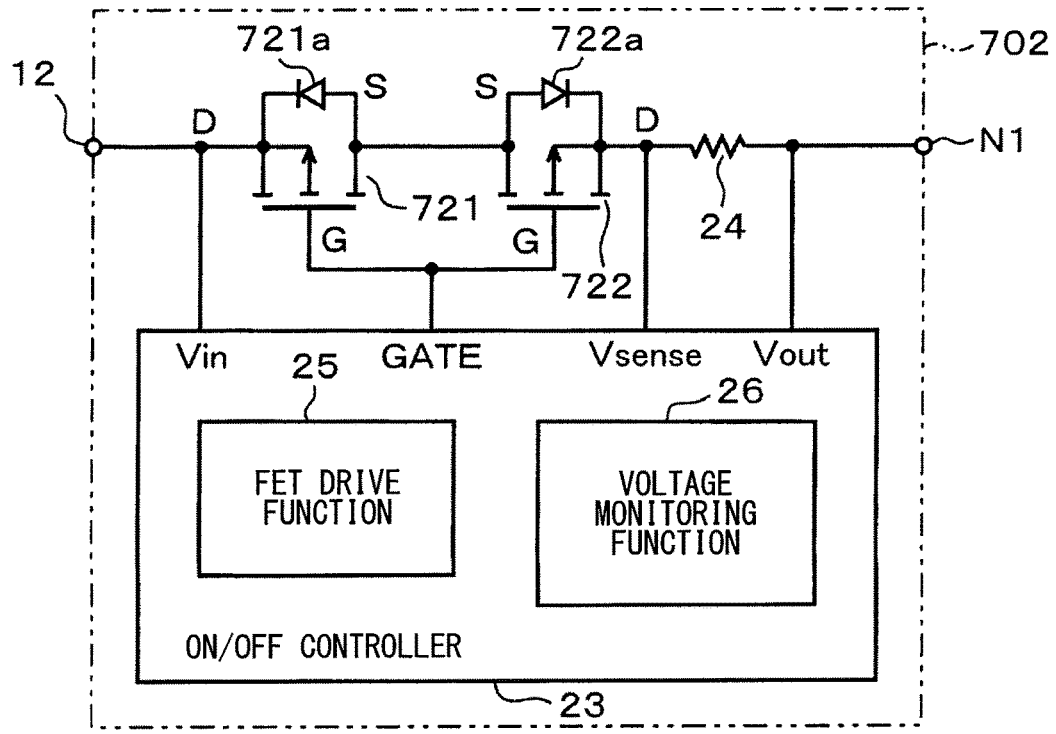
FIG. 9 is a second electrical configuration diagram of the reverse current protection circuit.

FIG. 8 and FIG. 9 show additional illustrative diagrams of a fifth embodiment. While the reverse current protection circuits 2 and 202 of the first and second embodiments are configured using N-channel MOSFETs 21, 22, 221, and 222, the reverse current protection circuit 602 or 702 may also be configured using P-channel MOSFETS 621, 622, 721, and 722 as shown in FIG. 8 or FIG. 9.

For example, the reverse current protection circuit 602 shown in FIG. 8 is configured to have the drain D and source S of the MOSFET 621, the source S and drain D of the MOSFET 622, and the sensing resistor 24 connected in series between the input terminal 12 and the node N1 of the power supply circuit 3. The MOSFET 621 includes a parasitic diode 621a in the forward direction from the drain D to the source S in the internal semiconductor structure. The MOSFET 622 includes a parasitic diode 622a in the forward direction from the drain D to the source S in the internal semiconductor structure. When the reverse current protection circuit 602 inputs battery voltage VB as input voltage Vin, as has been described in the previous embodiments, a voltage lower than this input voltage Vin is applied to the common source S of the MOSFETs 621 and 622 and to the drain D of the MOSFET 622.

When performing on-control on the MOSFETs 621 and 622, the on/off controller 23 applies a predetermined on-state control voltage Vcon that is lower than the expected input voltage Vin (e.g., 0 V, so that VGS is less than a threshold Vth) to the gates G. Current then flows from the input terminal 12 to the node N1. When performing off-control on the MOSFETs 621 and 622, the on/off controller 23 applies a predetermined off-state control voltage Vcoff that is higher than the expected input voltage Vin, or within the range of thresholds (so that VGS is equal to or higher than a threshold Vth) to the gates G. The MOSFETs 621 and 622 are then turned off. Thus reverse flow of current can be prevented even when the voltage of the node N1 becomes higher than the voltage of the input terminal 12.

The reverse current protection circuit 702 shown in FIG. 9 is configured to have the source S and drain D of the MOSFET 721, the drain D and source S of the MOSFET 722, and the sensing resistor 24 connected in series between the input terminal 12 and the node N1 of the power supply circuit 3. The MOSFET 721 includes a parasitic diode 721a in the forward direction from the drain D to the source S in the internal semiconductor structure. The MOSFET 722 includes a parasitic diode 722a in the forward direction from the drain D to the source S in the internal semiconductor structure. When the reverse current protection circuit 702 inputs battery voltage VB as input voltage Vin, as has been described in the previous embodiments, a voltage lower than the input voltage Vin is applied to the common drain D of the MOSFETs 721 and 722 and to the source S of the MOSFET 722.

When performing on-control on the MOSFETs 721 and 722, the on/off controller 23 applies a predetermined on-state control voltage Vcon that is lower than the expected input voltage Vin (e.g., 0 V, so that VGS is equal to or less than a threshold Vth) to the gates G. Current then flows from the input terminal 12 to the node N1. When performing off-control on the MOSFETs 721 and 722, the on/off controller 23 applies a predetermined off-state control voltage Vcoff that is higher than the expected input voltage Vin, or within the range of thresholds (so that VGS is equal to or higher than a threshold Vth) to the gates G. The MOSFETs 721 and 722 are then turned off. Thus reverse flow of current can be prevented even when the voltage of the node N1 becomes higher than the voltage of the input terminal 12.

With the P-channel MOSFETs 621, 622, 721, and 722, the same effects as those with the use of N-channel MOSFETs 21, 22, 221, and 222 can be achieved.

(Application Examples)

Various application examples of the above embodiments will be described below.

Some vehicles use idle-stop technology due to the trend for lower fuel consumption in recent years. In the vehicle that uses such an idle-stop technology, various devices (such as TV and radio) keep working to make the interior space of the vehicle comfortable even though the engine is not started up. These devices have a relatively high power consumption and as they keep consuming power, the battery voltage VB may be lowered significantly. When the vehicle engine is started by cranking, the battery voltage VB is reduced largely. When, in particular, the vehicle is in the idle-stop state and the engine is started by cranking, the drop of the battery voltage VB is particularly evident.

The first embodiment may be applied to such a case, for example. Even if the determination by the microcomputer 9 at step S4 in FIG. 3 is NO because of the battery voltage VB being lowered by the cranking in the idle-stop state, the microcomputer can initiate the power saving mode by the determination of YES at step S8. Accordingly, while the internal circuit 4 having driving/safety functions related to the driving/safety of the vehicle is kept working, the internal circuit 5 having general functions can be partly or entirely stopped to save power. This way, resetting of the system resulting from a factor that causes a battery voltage drop such as cranking can be prevented.

Before the engine is started, power is supplied from the battery power supply +B via the reverse current protection circuit 2. At this time, the microcomputer 9 can determine the driver gets on when the microcomputer 9 detects the open state of the door by acquiring door open/close information via the vehicle network. The microcomputer 9 may start up ahead from the sleep state to operate in the normal operation mode when it detects the open state of the door. With the microcomputer 9 started up ahead in the normal operation mode, it can switch between the normal operation mode and the power saving mode in accordance with the voltage conditions at step S4, S5, or S8 even when the battery voltage VB is lowered due to large power consumption by cranking upon the driver starting up the engine, whereby resetting, and restart, of the entire system can be prevented. This can shorten the apparent start-up time.

In some conventional cases, emergency data save control (such as writing data to a non-volatile memory) may be carried out to prevent deletion of internal data of the microcomputer 9 when cranking. Such emergency data save control need not be performed in the power save mode in which the system can operate with a low voltage.

In the drawings, numerals 4, 5, and 404 represent internal circuits (operating circuits), 6, 7, 31, and 32 represent diodes, 9 represents a microcomputer (operating circuit, or controller), 21, 22, 221, 222 represent N-channel MOSFETs (MOSFET), 621, 622, 721, 722 represent P-channel MOSFETs (MOSFET), 21a, 22a, 221a, 222a, 621a, 622a, 721a, 722a represent parasitic diodes, 23 represents an on/off controller, L1 represents main power supply line, L2 and L3 represent sub power supply lines, +B represents a battery power supply (main power supply), IG represents an ignition power supply (sub power supply), SUB represents a charging power supply (sub power supply), ACC represents an accessory power supply (sub power supply), ILL+ represents an illumination power supply (sub power supply), N1 represents a node (common connection node), and SY1, SY3, SY4, and SY5 represent the power supply system.

(Other Embodiments)

The present disclosure is not limited to the embodiments described above. For example, the following modifications or extensions are possible.

In vehicle applications, for example, the ignition power supply IG may be provided as required. The key switches SW1 to SW3 need not necessarily be a rotary type and may be a button type. The present application is effectively applied to not only vehicles but also various equipment that has power supplies functioning as a main power supply and a sub power supply.

While the reverse current protection circuit 2 or 102 is shown to have a configuration that uses two MOSFETS 21 and 22 or 221 and 222, the reverse current protection circuit may be configured using one MOSFET, or three or more MOSFETs.

For example, functions provided by one constituent element may be divided to a plurality of constituent elements, or a function provided by a plurality of constituent elements may be integrated into one constituent element. At least part of the configuration of any of the previously described embodiments may be substituted with a known configuration having the similar function. Some or all of the configurations of two or more of the previously described embodiments may be combined, or added to or substituted with each other.

What is claimed is:

1. A power supply system configured to supply power from a main power supply input through a main power supply line and to supply power from a sub power supply input through a sub power supply line via a common connection node, the power supply system comprising:
a reverse current protection circuit including:
a MOSFET and an on/off controller, which is configured to apply an on-state control voltage or an off-state control voltage to a gate of the MOSFET in accordance with a voltage at a power supply node to which power is supplied from the main power supply line through the MOSFET,
wherein the reverse current protection circuit is configured to output power from the main power supply through the main power supply line to the common connection node via the MOSFET in response to the on/off controller applying the on-state control voltage to the gate of the MOSFET, and
wherein the reverse current protection circuit is configured to interrupt electrical connection between the main power supply line and the common connection node to prevent reverse flow of a current in response to the on/off controller applying an off-state control voltage to the gate of the MOSFET;
wherein the reverse current protection circuit is disposed between the main power supply line and the common connection node; and
a diode connected to enable a current flowing from the sub power supply line to the common connection node in a forward direction to prevent the current from flowing in a reverse direction, which is opposite to the forward direction,
wherein the diode is separately disposed from the reverse current protection circuit,
wherein the diode is disposed between the sub power supply line and the common connection node,
wherein a voltage drop of the main power supply from the main power supply line to the common connection node, when the on/off controller applies the on-state control voltage to the gate of the MOSFET, is lower than a voltage drop of the sub power supply from the sub power supply line to the common connection node via the diode, and
wherein the sub power supply as a voltage source is provided from the main power supply through a key switch, which is configured for on/off operation, or is provided from the main power supply through a charger.

2. The power supply system according to claim 1, wherein the MOSFET includes at least two MOSFETs, which are connected in series with respective drains or respective sources of the at least two MOSFETs connected to each other to have opposite polarities, the at least two MOSFETs including respective parasitic diodes each of which is forward-biased either from a source of the MOSFET to a drain of the MOSFET or from the drain of the MOSFET to the source of the MOSFET,
wherein the on/off controller is configured to apply the on-state control voltage or the off-state control voltage to respective gates of the at least two MOSFETs in accordance with voltage values of at least two of a plurality of power supply nodes to which power is supplied from the main power supply line via the at least two MOSFETs,
wherein, in response to the on/off controller applying an on-state control voltage to the respective gates of the at least two MOSFETs, the main power supply, which is input through the main power supply line, is output to the common connection node via the at least two MOSFETs, and
wherein, in response to the on/off controller applying an off-state control voltage to the respective gates of the two MOSFETs, electrical connection between the main power supply line and the common connection node is interrupted to prevent the current from flowing in the reverse direction.

3. The power supply system according to claim 1, further comprising:
  a controller that is configured to control operation modes of an operating circuit, which is operated by power supplied from the reverse current protection circuit and the diode via the common connection node,
  wherein the controller controls the operating circuit to
    operate in a normal operation mode in response to a voltage of the main power supply being equal to or more than a predetermined threshold voltage, and
    operate in a power saving mode with a lower power consumption than a power consumption in the normal operation, in response to the voltage of the main power supply being less than the threshold voltage.

4. A power supply system configured to supply power from a main power supply input through a main power supply line and to supply power from a sub power supply input through a sub power supply line via a common connection node, the power supply system comprising:
  an integrated ECU including a first terminal, a second terminal, a diode and a reverse current protection circuit,
  wherein the main power supply line is connected to the first terminal,
    wherein the sub power supply line is connected to the second terminal,
    wherein the diode is connected to enable a current flowing from the sub power supply line to the common connection node through the second terminal in a forward direction to prevent the current from flowing in a reverse direction, which is opposite to the forward direction,
  wherein the reverse current protection circuit includes:
    a MOSFET; and
    an on/off controller, which is configured to apply an on-state control voltage or an off-state control voltage to a gate of the MOSFET in accordance with a voltage at a power supply node to which power is supplied from the main power supply line through the first terminal and the MOSFET,
  wherein the reverse current protection circuit is configured to output power from the main power supply through the main power supply line to the common connection node via the MOSFET and the first terminal in response to the on/off controller applying the on-state control voltage to the gate of the MOSFET,
  wherein the reverse current protection circuit is further configured to interrupt electrical connection between the main power supply line and the common connection node to prevent reverse flow of a current in response to the on/off controller applying an off-state control voltage to the gate of the MOSFET,
  wherein a voltage drop of the main power supply from the main power supply line to the common connection node through the first terminal, when the on/off controller applies the on-state control voltage to the gate of the MOSFET, is lower than a voltage drop of the sub power supply from the sub power supply line to the common connection node via the diode and the second terminal, and
  wherein the sub power supply as a voltage source at the second terminal is provided from the main power supply through a key switch, which is configured for on/off operation, or is provided from the main power supply through a charger.

* * * * *